S. E. CRALL.
MILK PAIL.
APPLICATION FILED NOV. 16, 1907.

963,873.

Patented July 12, 1910.
2 SHEETS—SHEET 1.

Witnesses
W. W. Rockwell
F. G. Smith

Inventor
Sarah E. Crall
By Chandler & Chandler
Attorneys

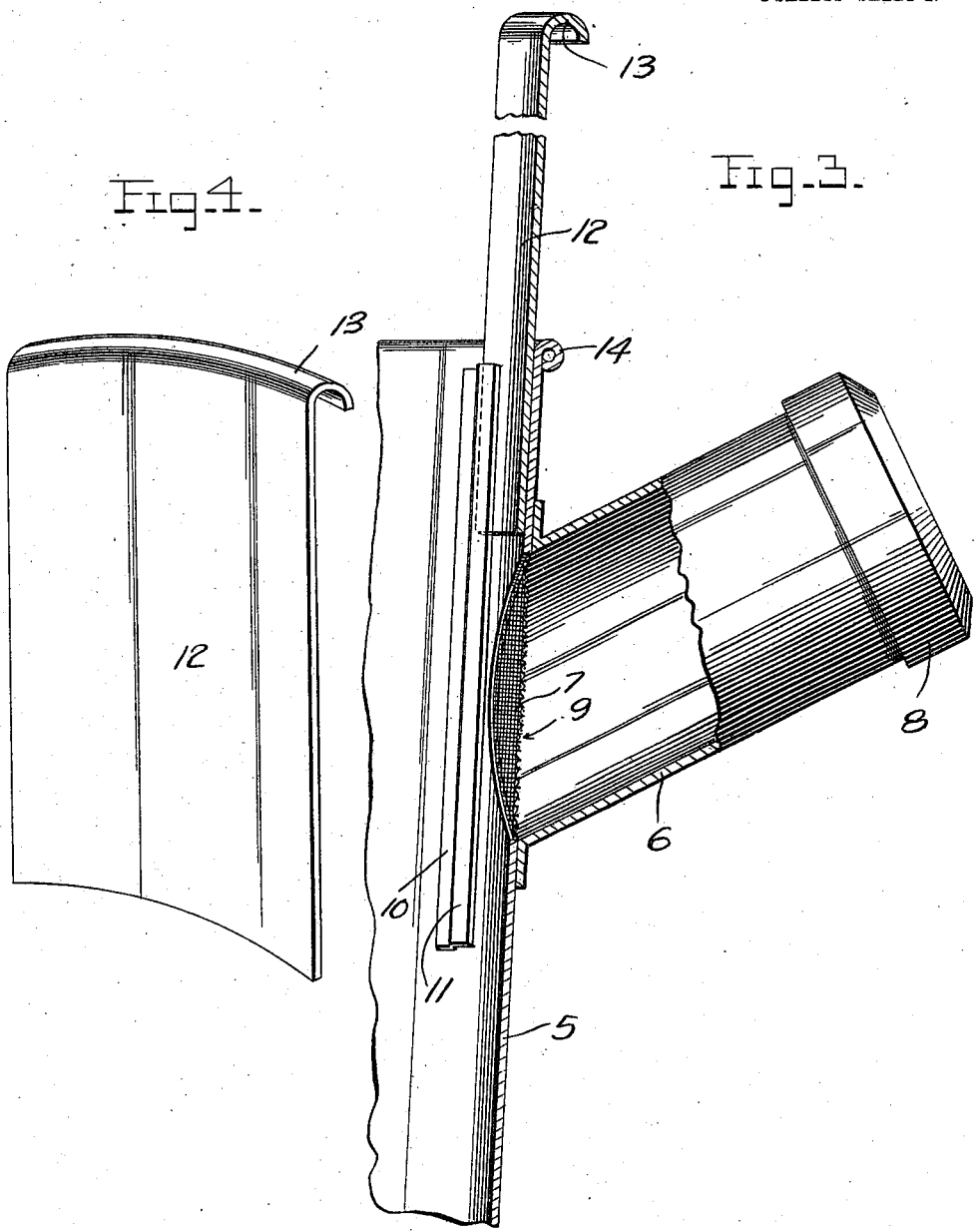

UNITED STATES PATENT OFFICE.

SARAH E. CRALL, OF BANGOR, MICHIGAN.

MILK-PAIL.

963,873.  Specification of Letters Patent.  Patented July 12, 1910.

Application filed November 16, 1907. Serial No. 402,501.

*To all whom it may concern:*

Be it known that I, SARAH E. CRALL, a citizen of the United States, residing at Bangor, in the county of Van Buren, State of Michigan, have invented certain new and useful Improvements in Milk-Pails; and I do hereby declare the following to be a full, clear, and exact description of the invention, such as will enable others skilled in the art to which it appertains to make and use the same.

This invention relates to milk pails and has for its primary object to provide a milk pail which will be more sanitary than the ordinary ones now in use and which may be more readily kept clean.

In carrying out my invention I provide, in connection with a milk pail of the ordinary type having a pouring spout and a strainer arranged at its point of junction with the pail, a cut-off slide which may be moved to position to close the said spout and at the same time prevent the milk within the pail coming in contact with the strainer.

Figure 1:
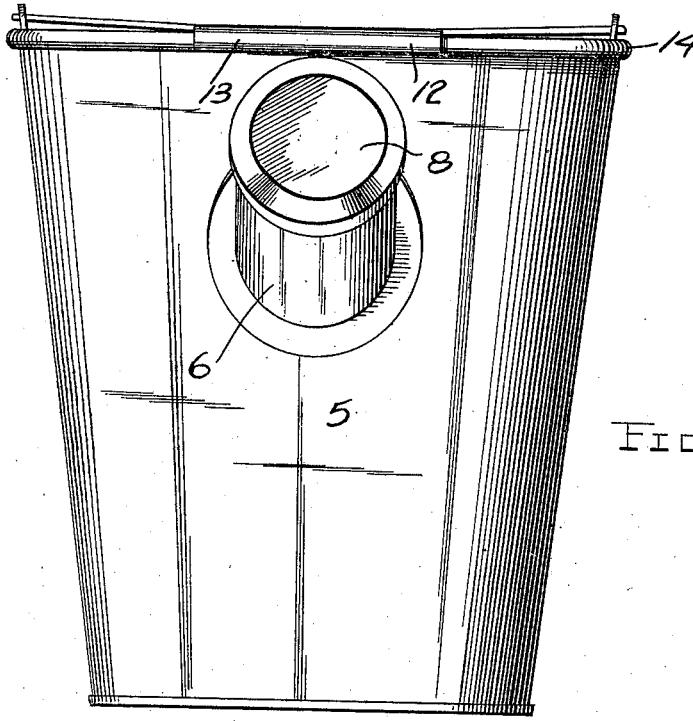
Figure 2:
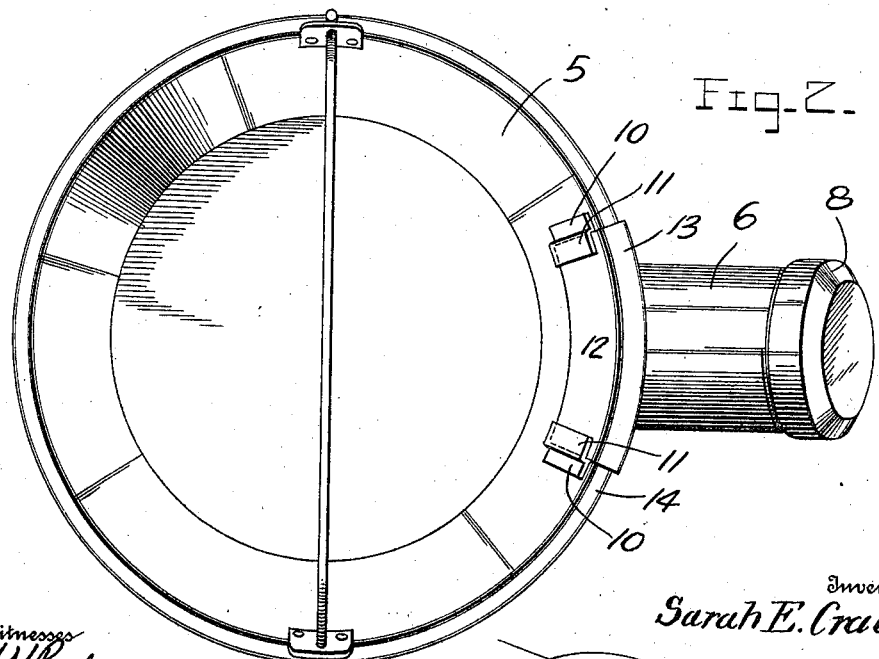

In the accompanying drawings, Figure 1 is a front elevation of a milk pail constructed in accordance with my invention, Fig. 2 is a top plan view thereof, Fig. 3 is a detail vertical sectional view taken therethrough at one side thereof, and, Fig. 4 is a detail perspective view of the slide.

In the drawings, there is shown a pail indicated by the numeral 5 the said pail being of the usual construction and being provided with a pouring spout 6 which extends upwardly and laterally therefrom. A wire gauze strainer 7 is fastened at the point of junction of the spout with the pail it being understood of course that when the milk is poured from the pail it will be strained. The spout 6 is exteriorly threaded at its end and engaged upon its said end is a cap closure 8 which, of course, is to be removed when it is desired to pour from the pail. Soldered or riveted upon the inner face of the pail upon opposite sides of the opening 9 across which the wire mesh is stretched are guides which are each comprised of an attaching portion 10 and a guide portion 11 which is formed by bending the strip of sheet metal from which the guide is formed in a zigzag manner, the said portion 11 being spaced from the wall of the pail The guide members it will be noted are open at their ends so that no obstructions occur to interfere with the thorough cleansing of the portion of the pail beneath the guides. Thus no inaccessible corners are produced in which insanitary matter can accumulate. This is an important feature in devices of this character wherein the thorough cleansing of the parts is an absolute necessity.

In connection with the pail and with the guide above described, I have provided a closure for the opening 9 which is in the form of a sheet metal plate or slide 12 bent transversely to conform to the curvature of the wall of the pail and this slide has its vertical edges seated in the guides to each side of the said opening 9, the said slide being movable vertically to close or clear said opening as will be readily understood. In order to limit the downward movement of the slide, the upper edge portion thereof is overturned as is indicated at 13 so as to fit over the rim or upper edge 14 of the pail when the slide is lowered to the proper degree.

From the foregoing description of my invention it will be understood that the guides 10 serve to hold the closure slide 12 snugly against the wall of the pail and that by so doing, the slide being lowered, contact of the milk or other contents of the pail with the wire mesh strainer 7 is obviated and consequently not only is the life of the strainer prolonged but it is kept clean.

What is claimed, is—

The combination with a vessel having an aperture in one of its side walls and spaced from its upper rim, of a spout connected to the outer face of the vessel and extending over the said aperture, guides connected to the interior of said vessel at opposite sides of said aperture and open at the upper and lower ends, whereby the guides are left free for cleansing, and a plate engaging said guideways and maintained in position thereby and with a stop rib at the upper end adapted to engage the upper rim of the vessel and limit the downward movement of the plate.

In testimony whereof, I affix my signature, in presence of two witnesses.

SARAH E. CRALL.

Witnesses:
 H. S. MACKELLAR,
 J. E. SEBRING.